United States Patent
Burch, Jr. et al.

(10) Patent No.: US 6,792,598 B2
(45) Date of Patent: Sep. 14, 2004

(54) INTEGRATED SOURCE CODE FILE AND METHOD AND APPARATUS FOR CREATING A COMPUTER PROGRAM THEREFROM

(75) Inventors: Charles Carroll Burch, Jr., Sandia Park, NM (US); William Meredith Menger, Houston, TX (US); Charles Ivan Burch, Ponca City, OK (US); Karen Pauline Goodger, Ponca City, OK (US); Maximillian McCalla Burton, Ponca City, OK (US); Thomas R. Stoeckley, Ponca City, OK (US); Donna Kay Vunderink, Burbank, OK (US); Richard Salisbury Day, Ponca City, OK (US); Douglas Wade Hanson, Ponca City, OK (US); Michael L. Sherrill, Newkirk, OK (US)

(73) Assignee: ConocoPhillips Company, Houston, TX (US)

( * ) Notice: Subject to any disclaimer, the term of this patent is extended or adjusted under 35 U.S.C. 154(b) by 215 days.

(21) Appl. No.: 09/951,377

(22) Filed: Sep. 13, 2001

(65) Prior Publication Data

US 2003/0051227 A1 Mar. 13, 2003

(51) Int. Cl.[7] .............................. G06F 9/45; G09G 5/00
(52) U.S. Cl. ...................... 717/136; 717/123; 345/762
(58) Field of Search ................................. 717/136–150, 717/105, 108–109, 123; 709/328; 345/744, 760, 762; 715/520, 513

(56) References Cited

U.S. PATENT DOCUMENTS

| | | | |
|---|---|---|---|
| 5,909,580 A | * | 6/1999 | Crelier et al. ................ 717/141 |
| 6,289,382 B1 | * | 9/2001 | Bowman-Amuah ......... 709/226 |
| 6,442,748 B1 | * | 8/2002 | Bowman-Amuah ......... 717/108 |
| 2001/0056433 A1 | | 12/2001 | Adelson et al. .......... 707/104.1 |

* cited by examiner

*Primary Examiner*—Antony Nguyen-Ba
(74) *Attorney, Agent, or Firm*—Sidley Austin Brown & Wood LLP

(57) ABSTRACT

An integrated source code file and a method and apparatus for creating a computer program from the integrated source code file. The integrated source code file is stored on a computer readable medium and the computer program created therefrom is executable by a computer system having a front-end for interfacing with a user, and a back-end for performing batch functions. The computer program comprises instructions for performing a function, which requires at least one parameter for its operation. The computer program further comprises instructions for validating the parameter, the instructions adapted to run on both the front-end and the back-end. The computer program also comprises graphical user interface information for creating a graphical user interface, which can be used to receive the parameter. The computer program still further comprises a documentation section for providing information related to the function, which is adapted for display via the graphical user interface.

49 Claims, 4 Drawing Sheets

INTEGRATED SOURCE CODE FILE AND METHOD AND APPARATUS FOR CREATING A COMPUTER PROGRAM THEREFROM

FIELD OF THE INVENTION

The present invention relates generally to computer software, and more particularly, to a program structure and a method and apparatus for creating a computer program.

BACKGROUND OF THE INVENTION

A computer program is a set of instructions or operations for a computer to perform. The computer program is typically stored on a computer readable medium accessible by the computer, such as a storage area or memory of the computer. The computer can retrieve an instruction from memory, perform the instruction, retrieve the next instruction, and so forth. The storage area can also contain data that is operated on by the instructions.

A computer program can be generally classified as an interactive program or as a batch program. An interactive program "interacts" with a user in that the program can require input from the user and can provide an output to the user. An example of an interactive program is a Web browser.

A batch program is designed to run without interaction with the user. A batch program can be started, for example, by a user through the use of an interactive program, or can be set to run automatically at a certain time. Once started, the batch program will run without requiring user interaction. Examples of batch programs include printing requests and certain computationally intensive numerical analysis programs.

A computer program is typically created in a high-level computing language, such as Fortran 90, C, C++, etc. Statements written in the high-level computing language form a source code file, which can be compiled (by an appropriate compiler) into an object file. The source code file is a human-readable form of the computer program, while the object file is in a machine language. The machine language can be optimized to work with a particular computer architecture (e g, a particular central processing unit (CPU) with its specific logic architecture and set of possible computer instructions). Alternatively, the machine language can be designed to run on any computer platform having the appropriate interpreter (e.g., Java virtual machine).

Many applications require the use of both interactive and batch programs. For example, in the data processing arena, an interactive program can be used in a front-end to interface directly with a user. A batch program can then be run in the back-end to perform the actual data processing functions requested by the user. The front-end program can interact directly with the back-end program or can use an intermediate program (e.g., an application program interface (API)) that mediates the front-end and back-end activities. The front-end program and the back-end program can be running on computers that are remotely located with respect to each other, or can be running on the same computer system.

The front-end program and the back-end program are required to interact with each other, such that the user's instructions to the front-end program are carried out by the back-end program. The front-end program and the back-end program, however, are different programs, which are often written by different programmers. For example, the front-end program can be designed to operate with a graphical user interface (GUI) to provide for ease of interfacing with a user. Thus, a programmer familiar with the intricacies of the GUI may be employed to write the front-end program. The back-end program, however, needs no user interface, as it typically interacts with either the front-end program or an API.

Computer programs are frequently modified to implement changes, add enhancements, or correct errors. Each time a computer program is modified, the programmer edits the source code file of the computer program. However, the source code file is not the only file that needs to be edited. The programmer is usually required (e.g., by a corporate software policy) to update a documentation file with relevant programming comments. Updates to a user documentation file may also be needed, especially if the modification to the computer program adds a new feature. A GUI file associated with the computer program may also be updated if the modification to the computer program impacts the GUI. Further, any modification to a front-end program can have a tremendous impact on the back-end program, in terms of the parameters that may be passed from the front-end program to the back-end program. As such, the back-end program may also need to be modified to work correctly with the new front-end program. Thus, even a small modification to a computer program can require the modification of a significant number of files.

As apparent from the above-described deficiencies, a need exists for program structure, a method, and an apparatus that allows a computer program to be modified, without the need for modifying a number of other files.

SUMMARY OF THE INVENTION

One aspect of the present invention is directed to a computer program, stored on a computer readable medium and executable by a computer system. The computer system has a front-end for interfacing with a user, and a back-end for performing batch functions. The computer program comprises instructions for performing a function. The function is adapted to run on the back-end of the computer system and requires at least one parameter for its operation. The computer program further comprises instructions for validating the parameter, which are adapted to run on both the front-end and the back-end of the computer system. The computer program also comprises graphical user interface information for creating a graphical user interface, which can be used to receive the parameter, and is adapted to run on the front-end of the computer system. The computer program still further comprises a documentation section for providing information related to the function, which is adapted for display via the graphical user interface. The instructions for validating the parameter can be used on the front-end to validate the parameter as it is entered via the graphical user interface and, additionally can be used on the back-end to validate the parameter before it is submitted as part of a batch program.

Another aspect of the present invention is directed to a method and apparatus for creating computer-executable instructions from a computer program. The computer program includes a source code section, a documentation section, and a graphical user interface section The source code section is compiled to create instructions for performing a function and instructions for validating a parameter associated with the function The graphical user interface section is extracted and used to create a graphical user interface, which can be used to receive the parameter. The documentation section is extracted for display via the graphical user interface.

Yet another aspect of the present invention is directed to a method and apparatus for creating computer executable instructions from a computer program. The computer program includes a source code section, a documentation section, and a graphical user interface section. The source code section is first compiled with a first compiler to create a first set of executable code adapted to run on a back-end of a computer system. The first set of executable code includes instructions for performing a function, and instructions for validating a parameter associated with the function. The source code section is compiled with a second compiler to create a second set of executable code adapted to run on a front-end of the computer system. The second set of executable code includes instructions for validating the parameter. The graphical user interface definition section is extracted and a graphical user interface is created therefrom for receipt of the parameter. The documentation section is extracted for display via the graphical user interface.

BRIEF DESCRIPTION OF THE DRAWINGS

A more complete understanding of the present invention and its advantages will be readily apparent from the following Detailed Description of the Preferred Embodiments taken in conjunction with the accompanying drawings. Throughout the accompanying drawings, like parts are designated by like reference numbers and in which.

DETAILED DESCRIPTION OF THE PREFERRED EMBODIMENTS

Figure 1:
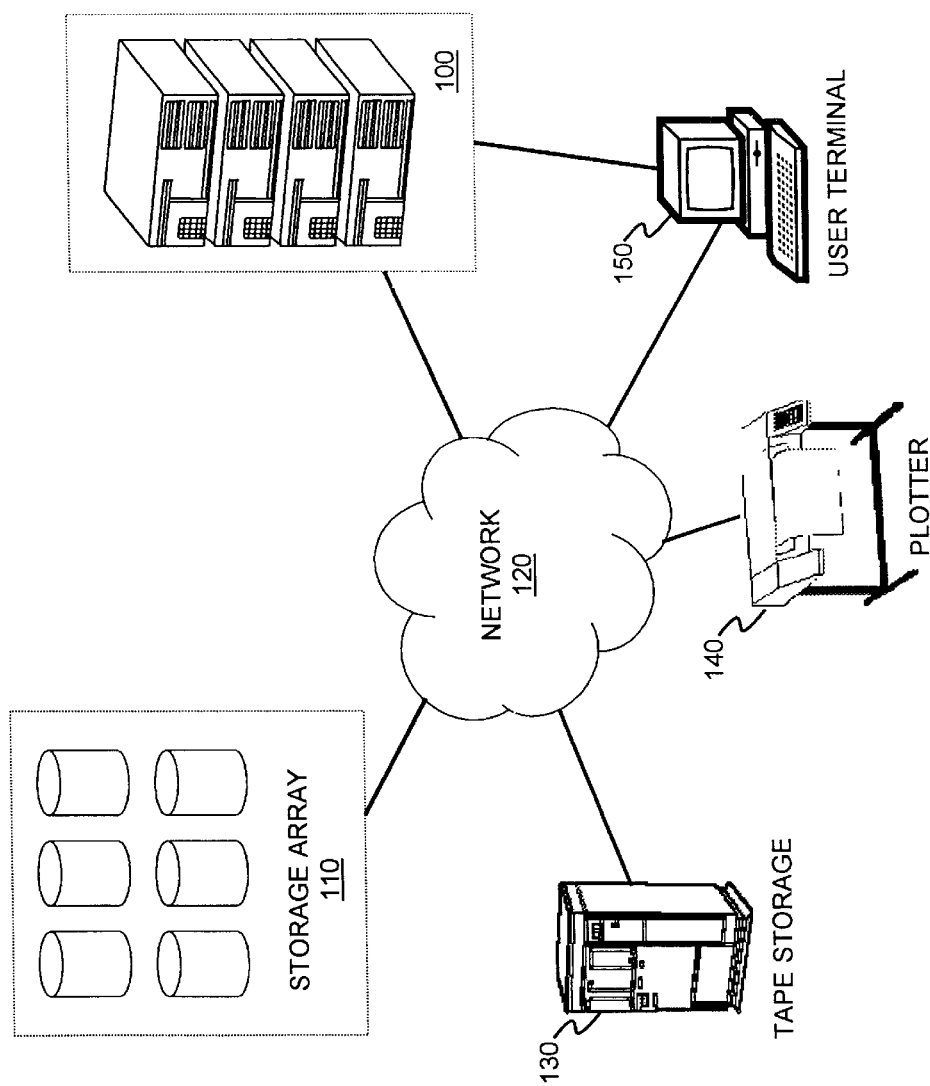
FIG. 1 is a schematic illustration of a computer network in accordance with the present invention.

FIG. 1 schematically illustrates a hardware environment of an embodiment of the present invention. A computer system 100 is connected to a storage array 110 via a communications network 120. A tape storage system 130 can be connected to the computer system 100 via the network 120 to provide for additional storage capability. A plotter 140, or other device for producing hardcopy displays, can also be connected to the computer system 100 via the network 120.

In a preferred embodiment, the computer system 100 is a multiprocessor supercomputer formed from a plurality of central processing units (CPUs), along with other ancillary elements. The computer system 100 can include, for example, hundreds of commodity CPUs, which are capable of providing hundreds or thousands of megaflops (a megaflop is generally defined to be about one million floating point operations per second). Alternatively, the computer system 100 can be a personal computer, workstation, minicomputer, mainframe, or any combination thereof. The network 120 can be a private network, a public network, or any combination thereof, including local-area networks (LANs), wide-area networks (WANs), or the Internet.

In a preferred embodiment, the storage array 110 is a RAID (redundant array of independent disks) array capable of providing terabytes of disk storage. The storage array 110 can include one or more hard disk drives, tape drives, solid state memory devices, or other types of storage devices.

The computer system 100 can be logically divided into a front-end portion and a back-end portion. The front-end includes a user interface, which can be provided at a terminal 150. The terminal 150 can be directly connected to the computer system 100, or can be connected to the computer system 100 via the network 120. The front-end interface allows a user to build and submit processing jobs and access certain utilities. The processing jobs can then be submitted to a desired hardware platform (e.g., in the back-end).

Processing jobs can be very complex, containing many calls to many processes, a large number of parameter values, and other information related to the computer platform and the programming language used. Building a "jobfile" for such jobs manually with a text editor can be a long, difficult, and error-ridden task. Therefore, a two-part process can be used to create the jobfile. A "workfile" can be created by the user, via the front-end. The front-end can be implemented, for example, with a graphical user interface (GUI), including elements such as windows (pull-down, pop-up, file tab), toolbars, scroll bars, buttons, etc. The user can create, using the front-end GUI, a workfile containing a sequence of processes desired to be performed, the parameter values associated with each of the processes, and other parameter values appropriate to the job. Through the GUI, the user can add or delete processes anywhere in the sequence, and can modify parameter values associated with the selected processes. The workfile is preferably a text file that can be edited with a text editor and can be used as a template to create new workfiles.

The information in the workfile can then be used by a job builder application to produce a "jobfile", which is capable of running on a selected computer system (on the back-end) and direct the execution of the job to produce the desired result. Once the jobfile has been built, it can then be submitted to the desired hardware platform on the back-end to run as a batch process. The jobfile is preferably a text file that can be edited with a text editor to create new jobfiles.

The back-end portion of the computer system 100 manages and communicates with various process modules, each of which performs specific functions during the execution of the processing jobs. In a preferred embodiment, wherein the computer system 100 includes a plurality of CPUs, a portion of the CPUs can be designated to perform the functions of the front-end portion, while another portion of the CPUs can be designated to perform the back-end data processing functions. Alternatively, in other embodiments wherein the computer system 100 is a personal computer, such as a laptop having a single CPU, the CPU can be capable of executing both the front-end code and the back-end code.

The computer system 100 can be used, for example, in numerical processing applications, such as seismic data processing and atmospheric modeling applications. The user can use the front-end to create a jobfile, which can include a designation of the data to be processed, and the processing step(s) to be performed. The processing of the data can then be performed by the back-end in accordance with the jobfile.

The jobfile can include a number of functions, such as loading data from a tape, performing an algorithmic calculation with respect to the data, and writing the new data to another tape. Each of these functions can be performed by a computer program in accordance with the present invention.

Figure 2:
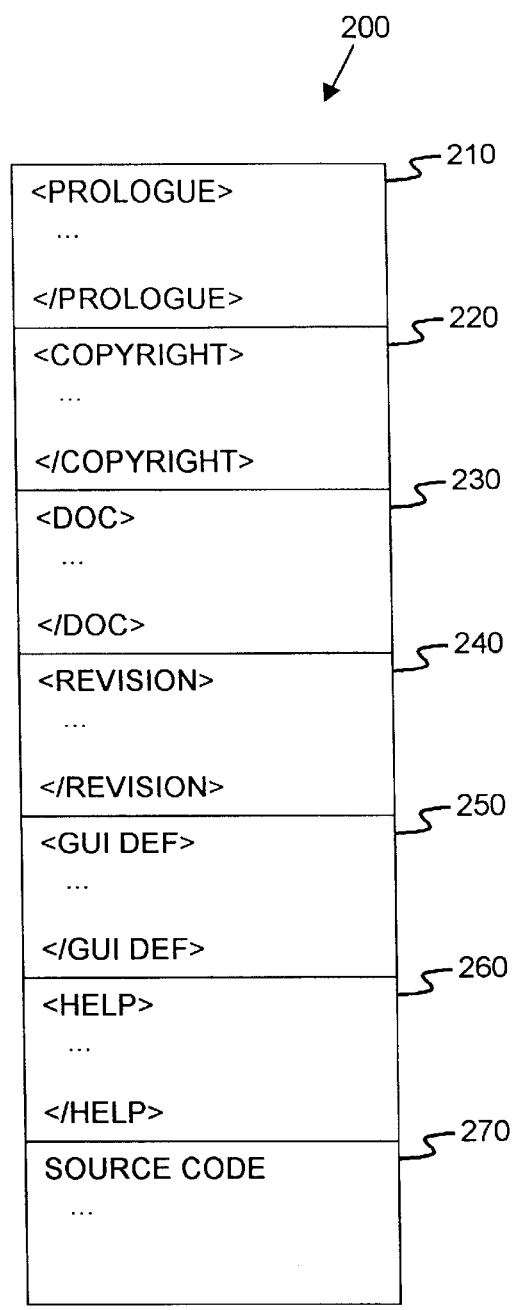
FIG. 2 is a block diagram illustrating a file structure for a computer program in accordance with the present invention.

FIG. 2 is a block diagram illustrating a structure for a computer program 200 in accordance with the present invention. The computer program 200 includes a prologue section 210, a copyright section 220, a documentation section 230, a revision history section 240, a GUI section 250, a help section 260, and a source code section 270. Each section preferably includes a begin tag and an end tag to delineate the section from prior and subsequent sections. The begin and end tags for all the sections 210–260, with the exception of the source code section 270, preferably includes a comment character, such that a compiler program used in compiling the source code section 270 will ignore the other sections 210–260.

The prologue section 210 can include information such as the name of the program, and other miscellaneous information. In a preferred embodiment, the prologue section 210 is delineated by a begin tag and an end tag. For example, the prologue section 210 can begin with a prologue tag (e.g., <PROLOGUE>) and end with an end prologue tag (e.g., </PROLOGUE>).

The copyright section 220 includes copyright information associated with the computer program 200, such as the copyright owner and the pertinent date(s). In a preferred embodiment, the copyright section 220 is delineated by a begin tag and an end tag. For example, the copyright section 220 can begin with a copyright tag (e.g., <COPYRIGHT>) and end with an end copyright tag (e.g., </COPYRIGHT>).

The documentation section 230 includes documentation associated with the computer program 200, such as documentation for the user and documentation for the programmer (e.g., programmers' notes or comments relating to the various features or functions performable by the computer program 200). In a preferred embodiment, the documentation section 220 is delineated by a begin tag and an end tag. For example, the documentation section 220 can begin with a documentation tag (e.g., <DOC>) and end with an end documentation tag (e.g., </DOC>).

The revision history section 240 includes revision history information associated with the computer program 200. In a preferred embodiment, the revision history section 240 is delineated by a begin tag and an end tag. For example, the revision history section 240 can begin with a revision history tag (e.g., <REVISION>) and end with an end revision history tag (e.g., </REVISION>).

The GUI section 250 includes GUI information, such as fields for displaying information for the user (help tips, etc.) and for receiving user input via parameter screens. In a preferred embodiment, the GUI section 250 included a GUI definition that is written in a high level layout format. The GUI definition can include, for example, fields and rules, which can be extracted and converted (by an application program) into an expression of a GUI in a markup language such as XML (extensible markup language). By using an application program to create the GUI from the GUI section 250, the present invention advantageously shields the programmer from the complexities associated with the creation of the GUI. Alternatively, the GUI section 250 can be written in XML or another graphical programming language. In either case, the GUI can be used to allow a user to interface with the computer program 200, for example, when the computer program 200 is running on the front-end of the computer system 100. In a preferred embodiment, the GUI section 250 is delineated by a begin tag and an end tag. For example, the GUI section 250 can begin with a GUI tag (e g, <GUI DEF>) and end with an end GUI tag (e.g., </GUI DEF>).

The help section 260 includes information used to provide help to a user of the computer program 200, for example, when the computer program 200 is running on the front-end of the computer system 100. In a preferred embodiment, the help section 260 is delineated by a begin tag and an end tag. For example, the help section 260 can begin with a help tag (e.g., <HELP>) and end with an end help tag (e.g., </HELP>).

The source code section 270 includes the source code for the computer program 200, which can be written in any high-level computing language, such as Fortran90, C, C++, etc. The source code section 270 is preferably the only section that is not preceded by a comment character. Thus, the source code section 270 can be compiled by an appropriate compiler. In one embodiment, the source code section 270 is delineated by a begin tag and an end tag. For example, the source code section 270 can begin with a source code tag (e.g., <SOURCE CODE>) and end with an end source code tag (e.g., </SOURCE CODE>). Alternatively, the source code section 270 need not have tags associated therewith.

The source code section 270 of the computer program 200 can be written by a programmer, typically using a text editor such as "vi" or "emacs". The text editor and other programming tools, such as one or more compilers, are generally available to the programmer. The programmer typically performs an interative process of editing, compiling, and testing the source code section 270 until satisfactory performance is achieved.

Figure 3:
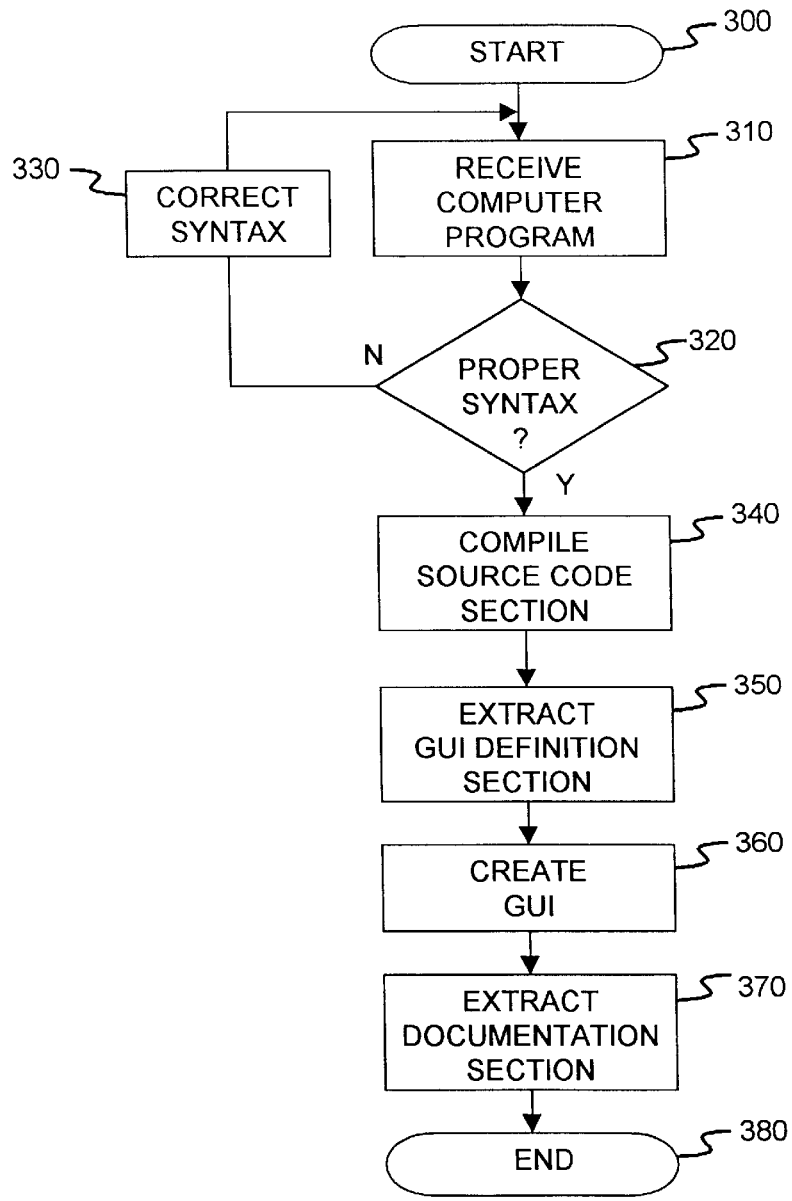
FIG. 3 is a flow diagram illustrating a process for creating a computer program in accordance with the present invention.

The computer program 200 thus encapsulates the source code, documentation, and GUI definition into a single, human-readable, integrated source code file. A plurality of computer programs, such as the computer program 200, each performing a different function, can be packaged together to form a complete software package. A programmer or system maintainer of the software package thus has only one file to modify when a change is desired to be made to one of the functions performed by the software package. Without the computer program 200 of the present invention, the programmer would need to update the source code for the function in one file, programmer documentation for the function in another file, the GUI in yet another file and possibly the user documentation in another file In a particularly advantageous embodiment, the computer program 200 can be written such that it is system independent, to allow for the computer program to be used in diverse coding environments without requiring the source code to be rewritten FIG. 3 illustrates a process for creating instructions, executable by a computer system, from a computer program in accordance with the present invention. The computer program 200 is designed to perform a particular function, which can be one of the many functions performable by a complete software package.

The process begins at step 300. In step 310, the computer program 200 is received, for example, by a system repository computer wherein the computer program 200 (or various portions thereof) is desired to be deposited. Then, in step 320, a syntax checking program verifies that the computer program 200 has the appropriate syntax, including the appropriate begin and ending tags for the sections 210–260. If the computer program 200 has the proper syntax (Yes in step 320) the process continues to step 340. Otherwise, in step 330, the process requests the programmer to correct the syntax and then returns to the start where it awaits the receipt of another computer program (or the revised computer program) for processing.

In step 340, the source code section 270 of the computer program 200 is compiled. A compiler such as a Fortran90 compiler can be used if the source code section 270 is written in the Fortran90 computing language. Alternatively, other compilers can be used, depending on the computing language used in the source code section 270. The step of compiling 340 produces a set of instructions for performing the particular function. Since the function to be performed may require certain operating parameters, the instructions produced by the compiler preferably include instructions for validating the parameters entered by a user for use with the function.

The source code section 270 is designed to be run on both the front-end and the back-end of the computer system. Thus, depending on the particular computer architecture of the front-end computer system and the back-end computer system, one or more compilers can be used to compile the source code section 270 For example, where the front-end computer system utilizes a different computer architecture from the back-end computer system, a first compiler can be used to compile the source code section 270 into a first set of instructions for running on the front-end computer system, while a second compiler can be used to compile the source code section 270 into a second set of instructions for running on the back-end computer system.

In step 350, a GUI extraction program (i.e., an application program for extracting the GUI from the computer program 200) parses through the computer program 200 and extracts the GUI section 250. The GUI extraction program can, in a preferred embodiment, extract the GUI section 250 based on the GUI section tag (e.g., <GUI DEF>) and the end tag (e.g., </GUI DEF>). Then, in step 360, a GUI creation program creates the GUI, which can be in the form of an XML document or another GUI format. In a preferred embodiment, a GUI parser program can extract the GUI section 250 and create the GUI therefrom. The GUI can be used to interact with a user who wishes to use the function. For example, the GUI can be used to request that the user enter certain parameters that are required by the function. For simple functions such as tape input, a required parameter can include a designation (e.g., by tape number) of one or more specific tapes to be read. When using a sequential set of tapes, the required parameters can include an identification of a first tape, and a number of subsequent tapes to be read. More complex functions such as numerical processing functions may require a large number of parameters. As the parameters are input via the GUI, the validation instructions produced by the compiler in step 340 can be used to validate the parameters, and to require the user to re-enter any invalid parameters.

In step 370, a documentation extraction program parses through the computer program 200 and extracts the documentation section 230. The document extraction program can also extract the help section 260. The documentation or help information extracted from the computer program 200 can be displayed to the user via the GUI created in step 360. The process then ends at step 380.

Figure 4:
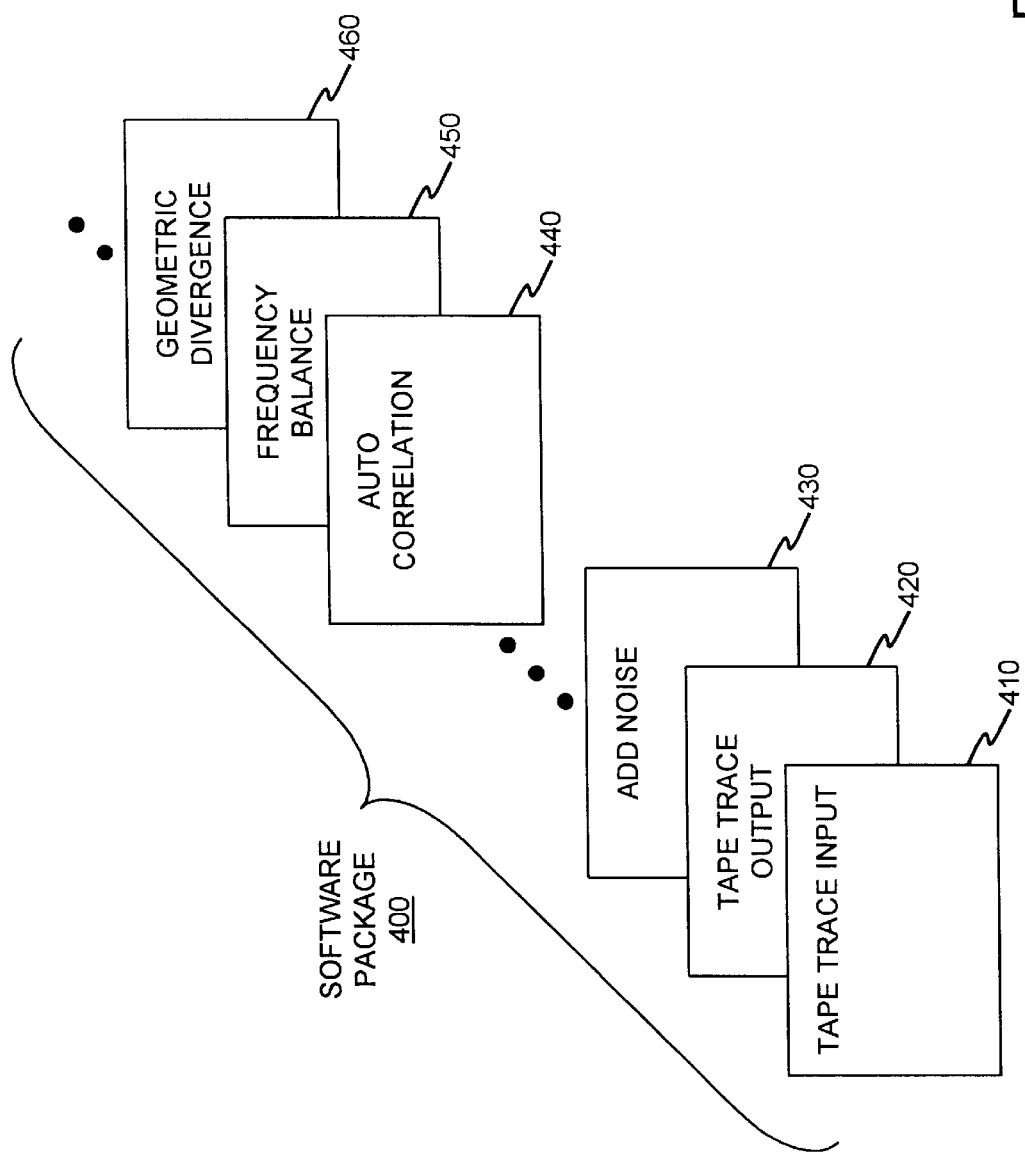
FIG. 4 is a block diagram illustrating a software package in accordance with the present invention.

FIG. 4 illustrates a software package 400 containing a plurality of computer programs in accordance with the present invention. Each of the computer programs is designed to perform a particular function In the illustrated embodiment, the software package 400 is designed for processing seismic data. The software package 400 can include the following computer programs for performing the following functions: The computer program "TAPE TRACE INPUT" 410 performs the function of receiving input trace data from on a tape. The computer program "TAPE TRACE OUTPUT" 420 performs the function of outputting trace data onto a tape. The computer program "ADD NOISE" 430 performs the function of adding white noise to a seismic trace. The computer program "AUTO CORRELATION" 440 performs the function of auto correlation of windowed trace data. The computer program "FREQUENCY BALANCE" 450 performs the function of spectral normalization of a seismic trace. The computer program "GEOMETRIC DIVERGENCE" 460 performs the function of applying an amplitude gain to compensate for lower amplitudes at various distances.

Each of the computer programs 410–460 of the software package 400 preferably includes a prologue section, a copyright section, a documentation section, a revision history section, a GUI section, a help section, and a source code section as illustrated and described with respect to FIG. 2. Thus, when one function, such as the GEOMETRIC DIVERGENCE function is desired to be modified, perhaps by changing the current algorithm to a more precise algorithm, a programmer need only access the computer program 460. Within the computer program 460, the programmer can edit the source code section to include the new algorithm. The programmer can also edit the documentation section to add programming comments regarding the code change. The programmer can also edit the help section to add any help notes relevant to the new algorithm. If the new algorithm requires additional parameters, the programmer can edit the GUI section to allow for the additional parameters, and can edit a validation portion of the source code section to include validation information for the new parameters. Once the programmer has completed all the necessary changes to the computer program 460, the computer program 460 can be compiled and parsed by the appropriate compilers and parser.

Since each of the computer programs 410–460 preferably includes, among other things, the source code section, the GUI section, and the documentation section, the programmer need only edit one file when making a change to a function performed by the software package 400. In conventional software systems, the programmer would need to change the source code for the function in a source code file, the GUI information in another file, and perhaps the documentation or help notes in yet another file.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A computer program, stored on a computer readable medium and executable by a computer system having a front-end for interfacing with a user and a back-end for performing batch functions, the computer program comprising:

instructions for performing a function, said function adapted to run on said back-end and requiring at least one parameter;

instructions for validating said at least one parameter, said instructions for validating being adapted to run on both said front-end and said back-end;

graphical user interface information for creating a graphical user interface for receipt of said at least one parameter, said graphical user interface being adapted to run on said front-end; and a documentation section for providing information related to said function, said information adapted for display via said graphical user interface.

2. A computer program in accordance with claim 1, wherein said instructions for validating said parameter are adapted to be compiled by a first compiler to create a first set of executable code for running on said front-end, said instructions for validating said parameter being adapted to be compiled by a second compiler to create a second set of executable code for running on said back-end.

3. A computer program in accordance with claim 1, wherein said graphical user interface information is delineated by a begin tag and an end tag, a graphical user interface parser extracting said graphical user interface information based on said begin tag and said end tag.

4. A computer program in accordance with claim 1, wherein said documentation section is delineated by a begin tag and an end tag, a documentation parser extracting said documentation section based on said begin tag and said end tag.

5. A computer program in accordance with claim 1, further comprising a revision history section for providing revision history information regarding said computer program.

6. A computer program in accordance with claim 1, wherein said documentation section comprises programming comments relating to said instructions for performing said function.

7. A computer program in accordance with claim 1, wherein said documentation section comprises documentation for providing help to a user of said computer program.

8. A computer program in accordance with claim 1, wherein said computer program is system independent.

9. A computer program in accordance with claim 1, wherein said front-end utilizes a different computer architecture from said back-end, said instructions for validating said parameter adapted to be compiled by a first compiler to create a first set of executable code for running on said front-end, and adapted to be compiled by a second compiler to create a second set of executable code for running on said back-end.

10. A software package, stored on a computer readable medium and executable by computer system having a front-end for interfacing with a user and a back-end for performing batch functions, the software package comprising:
  a plurality of computer programs, each of said computer programs adapted for performing a function and including:
    instructions for performing said function, said function adapted to run on said back-end and requiring at least one parameter;
    graphical use interface information for creating a graphical user interface for receipt of said at least on parameter, said graphical user interface being adapted to run on said front-end; and
    a documentation section for providing information related to said function, said information adapted for display via said graphical user interface;
    wherein each of said plurality of computer programs can be modified without affecting others of said plurality of computer programs in said software package; and
  wherein each of said computer programs further includes instructions for validating said at least one parameter, said instructions for validating being adapted to run on both said front-end and said back-end.

11. A software package in accordance with claim 10, wherein said instructions for validating are adapted to be compiled by a first compiler to create a first set of executable code for running on said front-end, said instructions for validating said parameter being adapted to be compiled by a second compiler to create a second set of executable code for running on said back-end.

12. A software package in accordance with claim 10, wherein said graphical user interface information is delineated by a begin tag and an end tag, a graphical user interface parser extracting said graphical user interface information based on said begin tag and said end tag.

13. A software package in accordance with claim 10, wherein said documentation section is delineated by a begin tag and an end tag, a documentation parser extracting said documentation section based on said begin tag and said end tag.

14. A software package in accordance with claim 10, wherein said each of said computer programs further comprises a revision history section for providing revision history information regarding said computer program.

15. A software package in accordance with claim 10, wherein said documentation section comprises programming comments relating to said instructions for performing said function.

16. A software package in accordance with claim 10, wherein said documentation section comprises documentation for providing help to a user of said computer program.

17. A software package in accordance with claim 10, wherein said software package is system independent.

18. A software package in accordance with claim 10, wherein said front-end utilizes a different computer architecture from said back-end, said instructions for validating adapted to be compiled by a first compiler to create a first set of executable code for running on said front-end, and adapted to be compiled by a second compiler to create a second set of executable code for running on said back-end.

19. A method for creating instructions, executable by a computer system, from a computer program having a source code section, a documentation section, and graphical user interface section, the method comprising the steps of:
  compiling said source code section to create instructions, adapted for execution on a back-end of a computer system, for performing a function and for validating a parameter associated with aid function;
  compiling said source code section to create instructions, adapted for execution on a front-end of a computer system, for validating said parameter;
  extracting said graphical user interface section and creating a graphical user interface therefrom for receipt of said parameter; and
  extracting said documentation section for display via said graphical user interface.

20. A method in accordance with claim 19, wherein said graphical user interface section is delineated by a begin tag and an end tag, said step of extracting said graphical user interface being performed based on said begin tag and said end tag.

21. A method in accordance with claim 19, wherein said documentation section is delineated by a begin tag and an end tag, said step of extracting said documentation section being performed based on said begin tag and said end tag.

22. A method in accordance with claim 19, wherein said computer program further has a revision history section for providing revision history information regarding said computer program.

23. A method in accordance with claim 19, wherein said documentation section comprises programming comments relating to said instructions for performing said function.

24. A method in accordance with claim 19, wherein said documentation section comprises documentation for providing help to a user of said computer program.

25. A method in accordance with claim 19, wherein said computer program is system independent.

26. A method in accordance with claim 19, wherein said front-end utilizes a different computer architecture from said back-end.

27. An apparatus for creating instructions, executable by a computer system, from a computer program having a source code section, a documentation section, and a graphical user interface section, the apparatus comprising:
  a compiler for compiling said source code section to create instructions for performing a function and instructions for validating a parameter associated with said function, wherein said instructions for performing said function are adapted for execution on a back-end of a computer system, and said instructions for validating are adapted for execution on said back-end and are further adapted for execution on a front-end of a computer system;
  a first parser for extracting said graphical user interface section and creating a graphical user interface therefrom for receipt of said parameter; and
  a second parser for extracting said documentation section for display via said graphical user interface, said documentation section containing information related to said function.

28. An apparatus in accordance with claim 27, wherein said graphical user interface section is delineated by a begin tag and an end tag, said first parser extracting information between said begin tag and said end tag.

29. An apparatus in accordance with claim 27, wherein said documentation section is delineated by a begin tag and an end tag, said second parser extracting information between said begin tag and said end tag.

30. An apparatus in accordance with claim 27, wherein said computer program further has a revision history section for providing revision history information regarding said computer program.

31. An apparatus in accordance with claim 27, wherein said documentation section comprises programming comments relating to said instructions for performing said function.

32. An apparatus in accordance with claim 27, wherein said documentation section comprises documentation for providing help to a user of said computer program.

33. An apparatus in accordance with claim 27, wherein said instructions are system independent.

34. A method for creating instructions, executable by a computer system, from a computer program having a source code section, a documentation section, and graphical user interface section, the method comprising the steps of:
  compiling said source code section with a first compiler to create a first set of executable code adapted to run on a back-end of a computer system, said first set of executable code including instructions for performing a function and instructions for validating a parameter associated with said function;
  compiling said source code section with a second compiler to create a second set of executable code adapted to run on a front-end of a computer system, said second set of executable code including instructions for validating said parameter;
  extracting said graphical user interface section and creating a graphical user interface therefrom for receipt of said parameter; and
  extracting said documentation section for display via said graphical user interface.

35. A method in accordance with claim 34, wherein said graphical user interface section is delineated by a begin tag and an end tag.

36. A method in accordance with claim 34, wherein said documentation section is delineated by a begin tag and an end tag.

37. A method in accordance with claim 34, wherein said computer program further has a revision history section for providing revision history information regarding said computer program.

38. A method in accordance with claim 34, wherein said documentation section comprises programming comments relating to said instructions for performing said function.

39. A method in accordance with claim 34, wherein said documentation section comprises documentation for providing help to a user of said computer program.

40. A method in accordance with claim 34, wherein said computer program is system independent.

41. A method in accordance with claim 34, wherein said front-end utilizes a different computer architecture from said back-end.

42. An apparatus for creating instructions, executable by a computer system, from computer program having a source code section, a documentation section, and graphical user interface section, the apparatus comprising:
  a first compiler for compiling said source code section to create a first set of executable code adapted to run on a back-end of a computer system, said first set of executable code including instructions for performing a function and instructions for validating a parameter associated with said function;
  a second compiler for compiling said source code section to create a second set of executable code adapted to on a front-end of a computer system, said second set of executable code including instructions for validating said parameter;
  a first parser for extracting said graphical user interface section and creating a graphical user interface therefrom for receipt of said parameter; and
  a second parser for extracting said documentation section for display via said graphical user interface.

43. An apparatus in accordance with claim 42, wherein said graphical user interface section is delineated by a begin tag and an end tag.

44. An apparatus in accordance with claim 42, wherein said documentation section is delineated by a begin tag and an end tag.

45. An apparatus in accordance with claim 42, wherein said computer program further has a revision history section for providing revision history information regarding said computer program.

46. An apparatus in accordance with claim 42, wherein said documentation section comprises programming comments relating to said instructions for performing said function.

47. An apparatus in accordance with claim 42, wherein said documentation section comprises documentation for providing help to a user of said computer program.

48. An apparatus in accordance with claim 42, wherein said computer program is system independent.

49. An apparatus in accordance with claim 42, wherein said front-end utilizes a different computer architecture from said back-end.

* * * * *